UNITED STATES PATENT OFFICE.

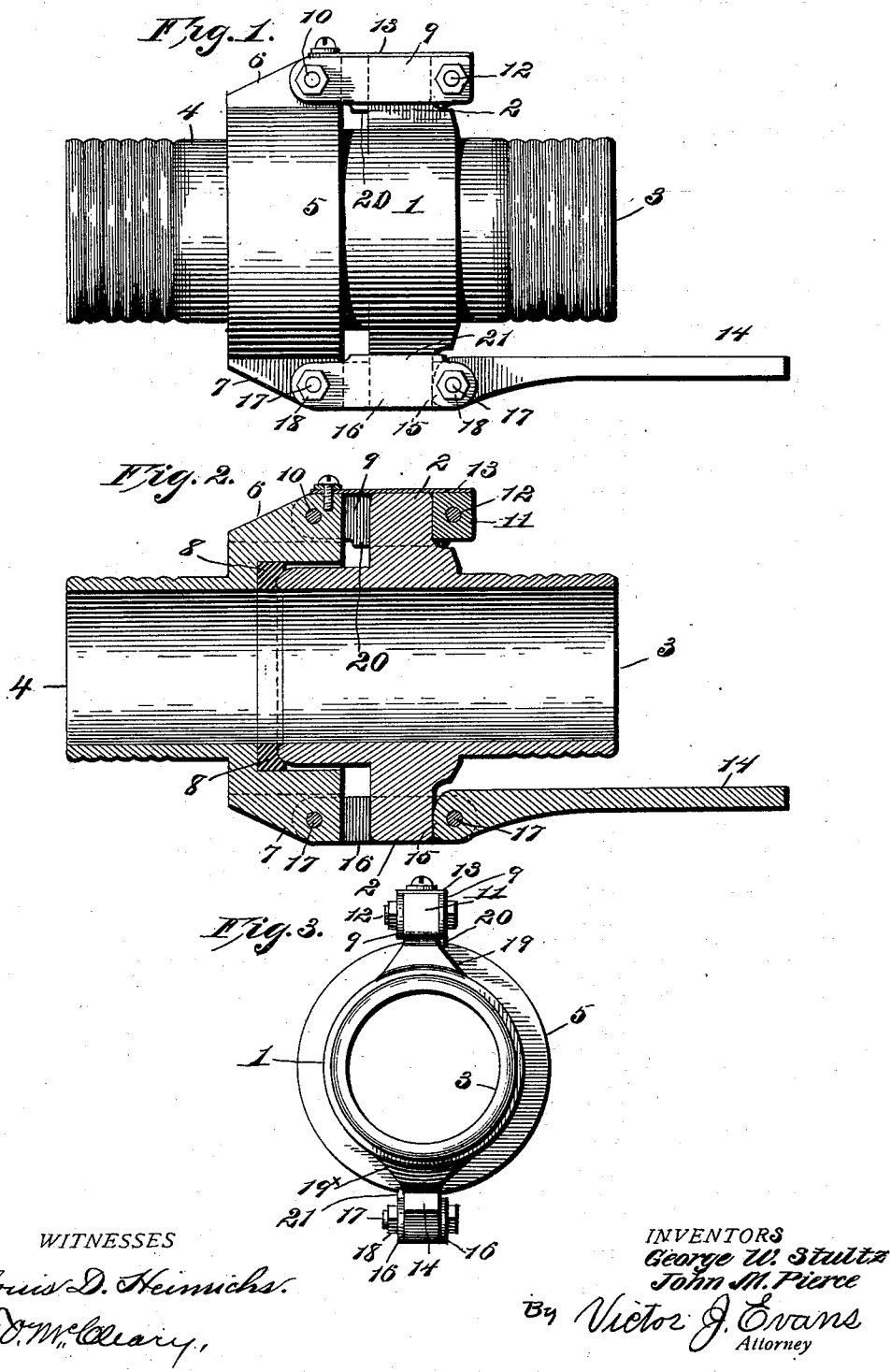

GEORGE W. STULTZ AND JOHN M. PIERCE, OF NEW KENSINGTON, PENNSYLVANIA.

HOSE OR PIPE COUPLING.

SPECIFICATION forming part of Letters Patent No. 648,363, dated April 24, 1900.

Application filed July 21, 1899. Serial No. 724,695. (No model.)

*To all whom it may concern:*

Be it known that we, GEORGE W. STULTZ and JOHN M. PIERCE, citizens of the United States, residing at New Kensington, in the county of Westmoreland and State of Pennsylvania, have invented certain new and useful Improvements in Hose or Pipe Couplings, of which the following is a specification.

Our invention relates to a hose and pipe coupling, the object being to provide a simple and efficient device of this character which may be readily operated to couple or uncouple sections of hose or pipe.

The construction of the improved coupling will be fully described hereinafter in connection with the accompanying drawings and its novel features defined in the appended claims.

In the drawings, Figure 1 is a side elevation of the coupling in locked position. Fig. 2 is a central vertical section of the same, and Fig. 3 is an end elevation thereof.

The reference-numeral 1 designates one member of the coupling, consisting of a sleeve formed with diametrically-opposite lugs 2 and having its outer end 3 threaded or corrugated for the attachment thereto of a hose or pipe.

The opposing sleeve 4 of the coupling is provided with a circumferentially-enlarged annular flange or collar 5, formed with diametrically-opposite lugs 6 and 7. The sleeve member 4 is also corrugated or threaded for the attachment of a hose or pipe. Within the collar 5 and abutting against the inner end of the member 4 is an elastic gasket 8, which is adapted to be compressed between the meeting ends of the coupling-sleeves to render the joint water-tight.

To the upper lug 6 of the sleeve 4 are pivotally secured two parallel plates 9, which at one end overlap the lug 6 and are secured thereto by a pivot-bolt 10. The opposite ends of these plates 9 are connected by a block 11, secured in place by a bolt 12. To the upper side of the lug 6 is secured one end of a flat spring 13, the free end of which bears against the upper side of the block 11.

14 designates a lever formed at one end with a cam 15 and connected by parallel links 16 to the lower lug 7 of the sleeve 4, said links being held pivotally by bolts 17 and nuts 18.

The lugs 2 of the sleeve 1 are enlarged at their bases and beveled at opposite sides, as shown, to form friction-surfaces 19.

One of the plates 9 is formed with a lip 20, which projects slightly below the lower edge of the other plate 9 to adapt it to bear against the beveled friction-surface 19 to raise the plates 9 against the tension of the spring 13 when the two coupling-sleeves are joined. One of the links 16 is also formed with a lip 21 to bear against the side $19^\times$ of the lower lug 2.

To couple the parts, one of the lugs 2 of the sleeve 1 is inserted between the plates 9, and the lever 14 is operated to draw the links 16 over the opposite lug 2, after which the lever is thrown to the horizontal position (shown in Figs. 1 and 2,) with its cam-head in contact with the lug, thus firmly clamping the coupling members together and compressing the rubber gasket between the meeting ends. The spring 13 permits the plates 9 to yield when the sleeve 1 is forced into the collar of the other sleeve.

We claim—

1. In a hose and pipe coupling, the combination with a sleeve formed with diametrically-opposite lugs, of a coöperating sleeve having an enlarged collar provided with diametrically-opposite lugs, a cam-lever pivotally secured to one of the lugs of the collar; parallel plates secured to the opposite lug of the collar, and connected by a block, and a spring arranged adjacent to said plates against which one of the lugs of the sleeve bears.

2. In a hose and pipe coupling, the combination with a sleeve formed with diametrically-opposite lugs, of a coöperating sleeve formed with a circumferentially-enlarged collar provided with diametrically-opposite lugs; a yielding gasket within said collar; parallel plates secured at one end on opposite sides of one of the lugs of the collar and connected at their opposite ends by a block; a flat spring extending from one of the collar-lugs to said block; a cam-lever; and parallel links for connecting said lever to the other lug of the collar.

3. In a hose and pipe coupling the combination with a sleeve formed with opposite lugs having beveled enlargements, of a coöperating sleeve formed with an enlarged collar having opposite lugs; parallel plates secured at one end to one of the lugs of the collar, and connected at their opposite ends by a block; one of said plates having a projecting contact-lip; a spring extending from one of the collar-lugs to said block; and a cam-lever connected to the other lug of the collar by parallel links, and adapted to bear against the adjacent lug of the first-named coupling-sleeve.

In testimony whereof we affix our signatures in presence of two witnesses.

GEORGE W. STULTZ.
JOHN M. PIERCE.

Witnesses:
GEO. D. HAMOR,
H. J. ANDERSON.